United States Patent [19]

Naidu et al.

[11] Patent Number: 5,510,696
[45] Date of Patent: Apr. 23, 1996

[54] ZERO CURRENT SWITCHING BETWEEN WINDING SETS IN A PERMANENT MAGNET ALTERNATOR HAVING A SPLIT WINDING STATOR

[75] Inventors: Malakondaiah Naidu, Troy; James C. Erskine, Jr., Brimingham, both of Mich.

[73] Assignee: General Motors Corporation, Detroit, Mich.

[21] Appl. No.: 333,662

[22] Filed: Nov. 3, 1994

[51] Int. Cl.⁶ ........................................ H02P 9/00
[52] U.S. Cl. ................... 322/29; 322/90; 322/94
[58] Field of Search .................. 323/234, 235, 323/237, 251, 252, 254, 255, 265, 266, 292, 299; 322/7, 8, 22, 23, 24, 25, 28, 29, 37, 89, 90, 93, 94

[56] References Cited

U.S. PATENT DOCUMENTS 3,793,544  2/1974  Baumgartner et al. .
4,730,097  3/1988  Campbell et al. .
4,780,619  10/1988  Campbell et al. .
4,924,371  5/1990  Peterson .
4,947,053  8/1990  Campbell et al. .
5,057,763  10/1991  Torii et al. .
5,066,866  11/1991  Hallidy .
5,068,589  11/1991  Offiler et al. .
5,214,371  5/1993  Naidu .

Primary Examiner—Bentsu Ro
Attorney, Agent, or Firm—Vincent A. Cichosz

[57] ABSTRACT

An apparatus for selectively rectifying one of a pair of output voltages associated with one of a a pair of output winding sets of a polyphase alternating current generator has a single controlled bridge rectifier selectively coupled to one of the winding sets. The bridge rectifier is selectively coupled in accordance with a predetermined rotational speed of the rotor. Transitions between the two winding sets is caused to occur at zero current conditions of the windings.

8 Claims, 2 Drawing Sheets

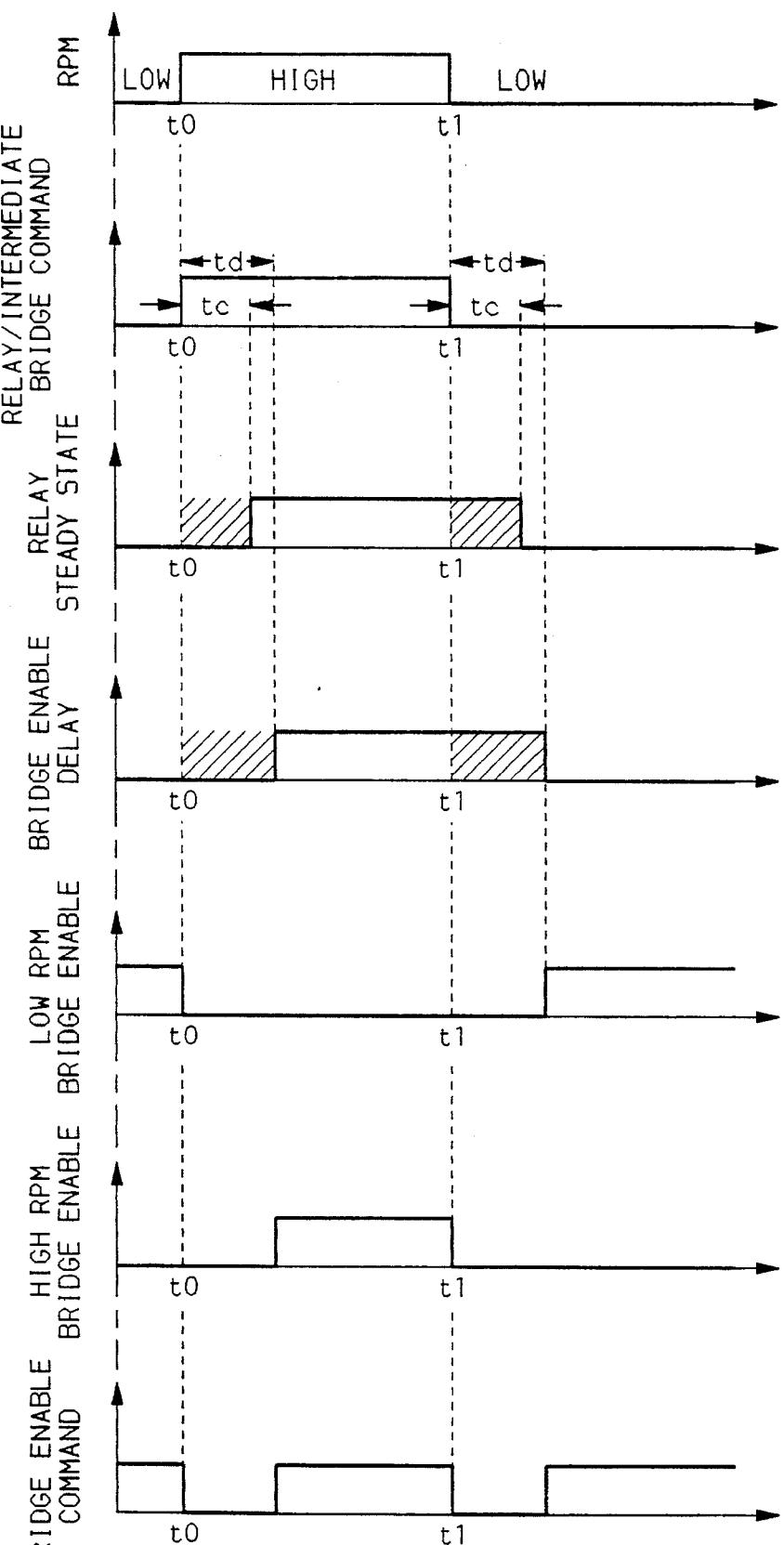

ZERO CURRENT SWITCHING BETWEEN WINDING SETS IN A PERMANENT MAGNET ALTERNATOR HAVING A SPLIT WINDING STATOR

BACKGROUND OF THE INVENTION

This invention relates to voltage regulating apparatus for variable speed permanent magnet alternating current generators.

Voltage regulator systems for permanent magnet alternating current generators are known, examples being the systems disclosed in the U.S. Pat. Nos: 3,443,197; 3,369,170; 3,427,529. In the systems of these patents the output or stator winding of a permanent magnet alternator is connected to a bridge rectifier that is comprised of controlled rectifiers and diodes. By turning the controlled rectifiers on and off as a function of the output voltage of the bridge rectifier, the direct output voltage of the bridge rectifier is maintained substantially constant.

One of the problems associated with the systems of the type disclosed in the above referenced patents is that the systems have high copper losses in the stator winding and poor power factor at high rotor speeds.

A voltage regulating circuit for a variable speed permanent magnet alternating current generator which reduces the copper loss in the stator or output winding of the generator and improves the power factor at high rotor speeds has been disclosed in U.S. Pat. No. 5,214,371 assigned to the assignee of the present invention. In that circuit, a stator or output winding is comprised of two sets of windings. The first winding set has a larger number of turns than the second winding set. The first winding set is connected to a first bridge rectifier that has a plurality of controlled rectifiers, and the second winding set is connected to a second bridge rectifier that has a plurality of controlled rectifiers. The system is arranged to enable the first bridge rectifier and disable the second bridge rectifier when the speed of the rotor of the generator is below a predetermined speed. At rotor speeds above the predetermined speed, the second bridge rectifier is enabled and the first bridge rectified is disabled. Both bridge rectifiers feed a direct voltage load which may be the battery or other loads in a motor vehicle electrical system. The output voltage of the bridge rectifiers is sensed and the system controls the conduction angle of the controlled rectifiers as a function of the sensed bridge rectifier output voltage to maintain the output voltage of the bridge rectifier that is enabled substantially constant.

While the advances embodied in the circuit of U.S. Pat. 5,214,371 as outlined are significant, some improvements, particularly with respect to circuit complexity and component parts proliferation are desirable.

SUMMARY OF THE INVENTION

Therefore, in accordance with one aspect of the present invention, a voltage regulator system for a permanent magnet alternating current generator is provided having a single controlled bridge rectification means and steering means for selecting as the input thereto one of the first and second winding sets of a split winding stator.

According to one embodiment of the invention, the controlled bridge rectification means comprises a semi-controlled bridge having both controlled rectifiers and diodes.

In accordance with another aspect of the present invention, the steering means is characterized by zero current switching of winding sets so as to avoid problems associated therewith.

According to yet another aspect of the present invention, a low cost three-pole double-throw relay controlled to switch under zero current conditions is utilized as the steering means to provide selection as between the two sets of windings.

According to these and other aspects and objects of the present invention, a vehicle electrical system having a permanent magnet multi-phase alternating current generator has a first winding set with a larger number of turns per phase than a second winding set. Each of the winding sets has AC output voltage terminals, only one set of which supplies voltage to a single full-wave rectification means at any on time for rectifying the AC output voltage thereof into a DC output voltage.

A steering means is operative in a first mode to couple the bridge to the first winding set and decouple the bridge from the second winding set. Likewise, it is operative in a second mode to couple the bridge to the second winding sets and decouple the bridge from the first winding set. Means are provided for selecting the first mode when alternator rotor speed is below a predetermined speed and for selecting the second mode when the speed is above the predetermined speed.

In accordance with a preferred embodiment of the invention, the full-wave rectifier bridge comprises a plurality of controlled rectifiers whose conduction is controlled such that the transition between first and second coil sets is caused to occur under conditions of zero winding current.

BRIEF DESCRIPTION OF THE DRAWINGS

FIGS. 2A–2G illustrate various circuit events, states and timing functions associated with a preferred embodiment of the present invention as carried forth in the illustrated circuit of FIG. 1.

DETAILED DESCRIPTION OF THE INVENTION

Figure 1:
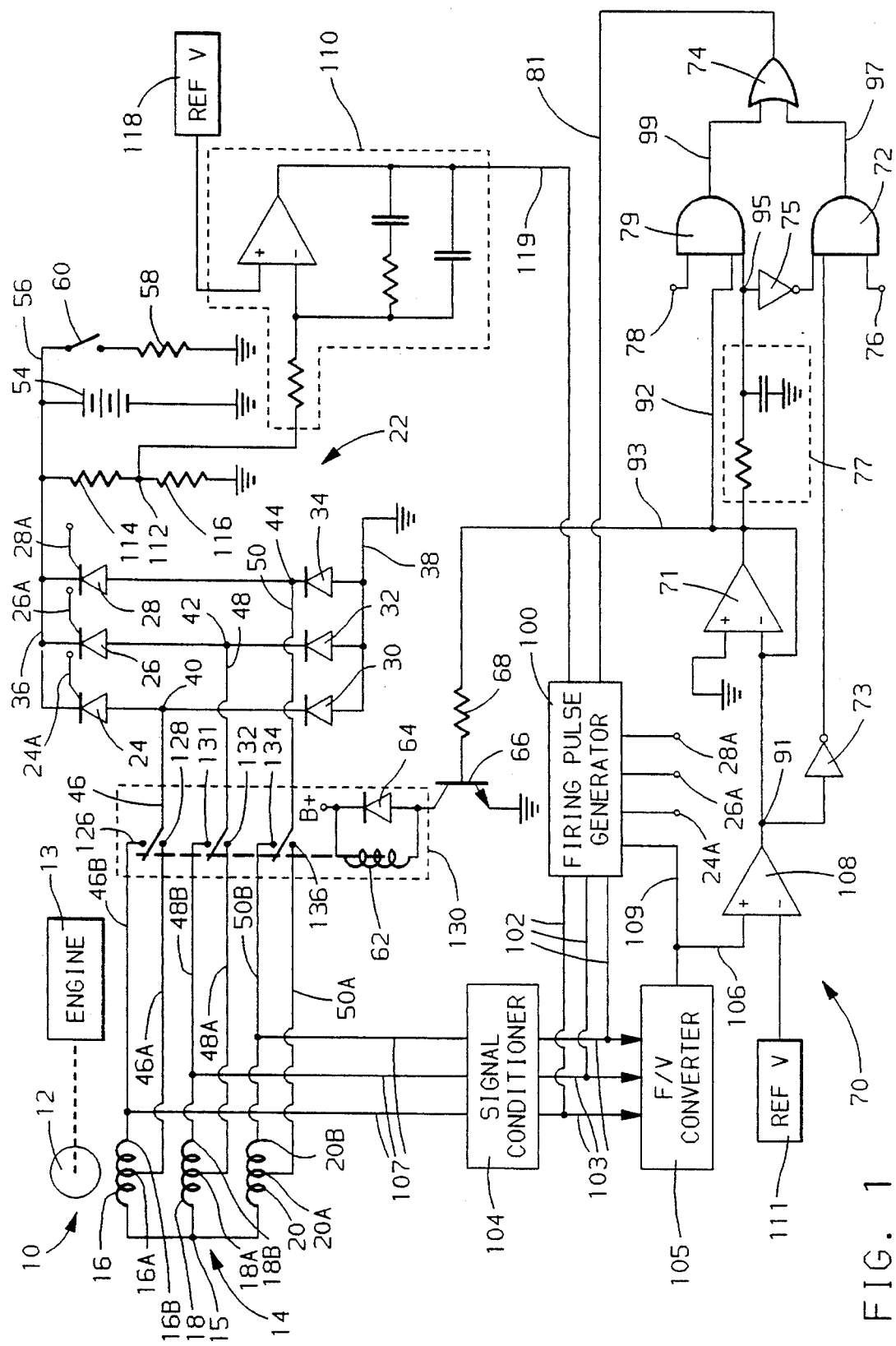
FIG. 1 is a circuit diagram of a voltage regulating system made in accordance with this invention.

Referring first to FIG. 1 the reference numeral 10 designates a permanent magnet alternating current generator that has a rotor 12 and a three phase Y-connected output for stator winding 14. The rotor 12 is driven at a variable speed by an engine 13 on a motor vehicle. The rotor 12 has permanent magnets (not illustrated) and as it rotates an alternating voltage is induced or generated in output winding 14. The frequency of the alternating voltage generated in winding 14 is directly proportional to the speed of rotation of rotor 12. Further, the magnitude or amplitude of this voltage is a function of rotor speed, that is, as rotor speed increases the amplitude of the voltage increases and vice-versa. Output winding 14 has a neutral 15 and is comprised of phase windings 16, 18 and 20. Each phase winding has a tap which are designated respectively as 16A, 18A and 20A. The ends of the phase windings are connected respectively to junctions 16B, 18B and 20B. The phase winding taps 16A, 18A and 20A can be arranged such that the voltage between the neutral 15 and a given tap is about one third of the voltage between the neutral 15 and an end of a given phase winding. Thus, by way of example, the voltage between neutral 15 and tap 16A can be about one third of the voltage between the neutral 15 and the end 16B of phase winding 16. Thus in terms of the number of stator winding turns if the number of turns between neutral 15 and tap 16A is N turns, the number of turns between tap 16A and junction 16B would be 2N turns. This same relationship holds true for the other taps 18A and 20A. The system of this invention has a three phase full wave bridge rectifier or converter 22 comprised of three controlled rectifiers 24, 26 and 28, and three diodes 30, 32, and 34. The cathodes of controlled rectifiers 24, 26 and 28 are connected to a conductor 36 which forms the positive direct voltage output terminal or line for bridge rectifier 22. The anodes of diodes 30, 32 and 34 are connected to a conductor 38 which is grounded. Conductor 38 is the negative direct voltage output terminal or line for bridge rectifier 22.

Bridge rectifier 22 has alternating current input terminals 40, 42 and 44. Terminal 40 is selectively connected to one of junctions 16A and 16B by conductor 46 and a respective one of conductors 46A and 46B associated respectively with junctions 16A and 16B. In a similar fashion, terminal 42 is connected to one of junctions 18A and 18B by conductor 48 and a selected one of conductors 48A and 48B associated with junctions 18A and 18B, respectively. Likewise, terminal 44 is connected to one of junctions 20A and 20B by conductor 50 and a selected one of conductors 50A and 50B associated with junctions 20A and 20B, respectively. Selection between the respective pair of conductor paths available to couple input terminals 40, 42 and 44 to one of the two available junctions on respective split windings 16, 18 and 20 is accomplished by steering means 130 illustrated as a three pole double terminal relay in the present embodiment and hereinafter referred to as relay 130. For example, conductor 46 serves to couple terminal 40 to one of terminals 126 and 128 in accordance with the energization state of coil 62. Coil 62 is illustrated with one side thereof coupled to voltage source B+, typically vehicle system voltage, and the other side thereof coupled to ground through switching transistor 66. An unenergized coil 62 results in a normally closed relay state wherein conductor 46 is coupled to terminal 126 and ultimately via conductor 46B to junction 16B. Likewise, conductor 48 serves to couple input terminal 42 to one of terminals 131 and 132 in accordance with the energization state of relay coil 62. The upper terminal 131 as illustrated in FIG. 1 is the terminal selectably engaged when the coil 62 is in a deenergized state thereby coupling junction 18B to terminal 42 via conductor 48B, terminal 130 and conductor 48. The arrangement of conductor 50 in coupling input terminal 44 to one of the junctions 20A and 20B operates in a like fashion via terminals 134 and 136 and corresponding to energization state of coil 62. Therefore, upon deenergization, the normally closed position of relay 130 serves to couple junction 20B to terminal 44 via conductor 50B, terminal 134 and conductor 50. Energization of relay coil 62 causes all conductors 46, 48 and 50 to be coupled to the respective lower terminals 128, 132 and 136 of relay 130 thereby coupling input terminals 40, 42 and 44 to junctions 16A, 18A and 20A respectively.

The conductor 36 is connected to a positive power supply conductor 56 on a motor vehicle. A storage battery 54 for the motor vehicle electrical system has its positive side connected to conductor 56 and its negative side connected to ground. The battery 54 may be a 12 volt motor vehicle storage battery. Conductor 56 further feeds various other motor vehicle electrical loads 58 on the vehicle. A switch 60 is illustrated for controlling the energization of vehicle electrical loads 58.

It can now be appreciated that whenever bridge rectifier 22 is enabled, it will rectify the AC voltages generated in phase windings 16, 18 and 20 and will develop a direct voltage between conductors 36 and 38. Further, as will be explained in more detail hereinafter, the conduction angle of controlled rectifiers 24, 26 and 28 is controlled so that the direct voltage appearing between conductors 36 and 38 is maintained at a substantially constant value of about 14 volts irrespective of rotor speed. In this regard, the voltage generated in the phase windings 16, 18 and 20 varies as a function of engine and rotor speed and it is therefore necessary to control the direct voltage output of bridge rectifier 22 to provide a substantially constant direct voltage output for battery 54 and the other motor vehicle loads. It can be appreciated that while bridge rectifier 22 is enabled or in operation, relay 130 determines whether the entire phase windings 16, 18 and 20 carry current or only those portions of the phase windings between tap points 16A, 18A and 20A and neutral 15 carry current. The system operates such that only one of the two taps for each coil will be coupled to the bridge rectifier 22 at a time. Putting it another way, when relay 130 is energized, only a portion of the coils 16, 18 and 20 are utilized and when relay 130 is deenergized, the entire coils 16, 18 and 20 are utilized.

The system of this invention has a controlled rectifier firing angle control or control rectifier firing pulse generator 100 which operates to control the conduction angle of the controlled rectifiers 24, 26 and 28. Since control rectifier firing angle controls are known to those skilled in the art, control 100 has not been shown in detail. The firing pulse generator 100 receives input voltages via three input lines each designated as 102. The conductors or lines 102 are respectively connected to three lines or conductors each designed as 103. The lines 103 connect the output of a signal conditioner circuit 104 and the input of the frequency to voltage converter 105. The output of converter 105 is connected to a line or conductor 106. The converter 105 provides a voltage on line 106 that is proportional to the frequency of the voltage pulses on lines 103.

The input of signal conditioner 104 is respectively connected to the ends 16B, 18B and 20B of phase windings 16, 18 and 20 by three conductors or lines each designated as 107. The AC voltages generated in the phase windings are therefore applied to the input of signal conditioner 104. The signal conditioner 104 produces a series of square wave pulses that are applied to lines 103. Each square wave pulse is developed during a positive half cycle of an input AC phase voltage from the phase windings 16, 18 and 20. The frequency of the square wave pulses on lines 103 is directly proportional to the frequency of the alternating voltage generated in phase windings 16, 18 and 20 which, in turn, is directly proportional to the speed of rotation of rotor 12. The voltage on line 106 is applied to one input of the firing pulse generator 100 by conductor 109 and to one input of a voltage comparator 108. The other input of voltage comparator 108 is connected to a source of constant reference direct voltage 111. The purpose of the voltage comparator 108 will be described hereinafter. The system of this invention has a proportional and integral controller 110. One input of controller 110 is connected to a junction 112 between voltage divider resistors 114 and 116. Resistors 114 and 116 sends the direct voltage between conductor 56 and ground and the voltage at junction 112 therefore is a function of the voltage between conductor 56 and ground. The other input to controller 110 is connected to a source of constant reference direct voltage 118. The magnitude of the output voltage of controller 110 that is applied to line 119 depends on the difference between the reference voltage 118 and the voltage at junction 112. The line 119 is connected to an input of the pulse generator 100. If it is assumed it is desired to maintain a voltage of 14 volts between conductor 56 and ground, the signal developed by controller 110 on line 119 will, if the voltage between conductor 56 and ground is above 14 volts, tend to reduce the conduction angle of the controlled rectifiers by means of pulse generator 100. If the voltage between conductor 56 and ground 15 is below 14 volts, the signal on line 119 developed by controller 110 tends to increase the conduction angle of the controlled rectifiers of the bridge rectifiers by means of pulse generator 100.

The output of controlled rectifier firing angle control 100 is connected to three conductors which are labelled 24a, 26a and 28a. These three conductors are connected as inputs to a respective gate of controlled rectifiers 24, 26 and 28. The relay 130 is controlled as a function of the speed of rotation of rotor 12 and its speed varies with changes in the speed of engine 13. To this end, the selection control circuit labelled 70 is connected to the output of voltage comparator 108. The voltage comparator 108 compares the direct voltage on line 106 with the constant direct reference voltage provided by source 111. The magnitude of the voltage on line 106, as previously described, is proportional to the speed of rotation of rotor 12. The output of comparator 108 goes high and low depending upon the speed of rotation of rotor 12. When engine speed, and accordingly the speed of rotor 12, is below a predetermined speed the output of the comparator 108 is low. Accordingly, relay coil 62 is not energized and relay contacts 126, 131 and 134 are coupled to the bridge 22. Therefore, at engine and rotor speeds below a predetermined speed, relay 130 couples the full coils 16, 18 and 20 to the bridge rectifier 22. Similarly, when engine speed and hence the speed of rotor 12 is higher than the predetermined speed, the output of comparator 108 goes high thereby energizing relay 130. Contacts 128, 132 and 136 are thereby coupled to bridge rectifier 22. Accordingly, only a portion of coils 16, 18 and 20 are coupled to bridge rectifier 22.

In further explanation of the operation of this invention, circuit 70 will be explained with reference to FIGS. 1 and 2A–2G. The output from comparator 108 is buffered via amplifier 71 which serves to drive switching transistor 66 into saturation via line 93 and biasing resistor 68. Diode 64 provides transient voltage protection upon switching of relay 130 coil 62. A high state at the output of comparator 108 results in a high output from buffer amplifier 71 which in turn causes energization of relay coil 62. The output of comparator 108 is labeled 91 in FIG. 1 and corresponds to FIG. 2A. The output of buffer amplifier 71 labeled 93 follows the output of comparator 108 and is represented in FIG. 2B. The signal on line 93 comprises the relay command and an intermediate bridge command. FIG. 2C represents relay 130 steady state as between the energized and deenergized positions. A low state in FIG. 2C represents a deenergized relay 130 with contacts in the normally closed position thereby connecting the full windings 16, 18 and 20 to the bridge rectifier 22. Likewise, a high state shown in FIG. 2C represents the relay 130 in an energized steady state wherein only a portion of coils 16, 18 and 20 are connected to the bridge rectifier 22. An amount of delay between the time the relay is commanded into an energized state and attainment of the relay energized steady state is labeled Tc in reference to FIGS. 2B and 2C. An amount of time delay Tc comprises electrical delay due to the reactance of the relay coil 62 as well as mechanical delay due to switch bounce. The output 91 from comparator 108 is also inverted at 73 and therefrom input to and gate 72. The output 93 from buffer amplifier 71 similarly is fed into and gate 79 via line 92. It is assumed that lines 78 and 76 are at a high state at least during times when respective gates 79 and 72 are desirably activated. Lines 78 and and 76 are therfore either tied to a high logic level signal or alternatively may be tied to a signal indicative of the relay 130 position. For example, when relay 130 is deenergized a high signal is desirably applied to line 76 to enable gate 72 and when relay 130 is energized a high signal is desirably applied to line 78 to enable gate 79. Gate 72 output line 97 is represented by FIG. 2E and is referred to as the low RPM bridge enable signal. Output 99 of and gate 79 is illustrated in FIG. 2F and is referred to as the high RPM bridge enable signal. When the output of comparator 108 is high, gate 79 is enabled to pass a high signal therethrough and similarly when the output from comparator 108 is low, gate 72 is enabled to pass a high signal therethrough. Gates 72 and 79 are alternately enabled in dependence upon the state of output 91 of comparator 108.

If during operation of AC generator 10 relay 130 contacts were allowed to switch as between the two available contact positions, electrical arcing would be caused to occur due to the current coupled through the stationary and movable contacts. This undesirably would cause pitting and very short useful life of such a relay. Consequently it is desirable to cause switching to occur during periods of operation wherein current is substantially zero to avoid this problem. In accordance with this objective, firing pulse generator 100 is caused to be disabled when a low signal is introduced thereto on line 81. At any point during the operation of alternator 10 wherein the state of the output of comparator 108 changes, thereby indicating a transition from low speed to high speed or vice-versa, line 81 is caused to go low for a predetermined period of time in order that bridge rectifier 22 is disabled. This disablement of bridge rectifier 22 in turn causes current to go to zero and allow a window wherein zero current switching of the movable contacts of relay 130 from one position to another. The signal on line 81 is referred to as the bridge enable command and is illustrated in FIG. 2G. When a state change occurs at the output of comparator 108, the one of gates 79 and 72 which had been enabled by the previous state of lines 92 and 93, resepectively, now becomes disabled and the outputs of both gates 79 and 72 on lines 99 and 97 go low thereby resulting in a low output on line 81 from gate 74. After a period of time Td has expired, it is desirable to enable the one of the gates 79 and 72 which, in the previous speed range of operation, was disabled. This delay Td is chosen such that it is greater than the delay Tc associated with attainment of a steady state in relay 130 after the relay command is applied thereto via line 93. Such a time delay is introduced in the present embodiment by the RC time constant established in circuit 77 disposed between the output of buffer amplifier 71 and the inputs to gates 79 and 72. Gate 79 has an input directly thereto whereas gate 72 has an inverted input thereto. This signal at point 95 shown in FIG. 1 corresponds to FIG. 2D and referred to as the bridge enable delay.

With reference now specifically to FIGS. 2A–2G, and initially assuming low speed operation and steady state alternator operation, at time T0 high speed operation is attained and the relay and intermediate bridge command attains a high state. This causes the low RPM bridge enable signal to go low due to a disabled gate 72 and, consequently, the bridge enable command also goes low. At this time, bridge rectifier 22 has been disabled and current therethrough goes to zero. After a time Tc, the relay attains a steady state as illustrated as a high state in FIG. 2C, the contact switching which occurred as a result of the relay enable command therefore having occurred during zero current conditions. Low RPM bridge enable signal, high RPM bridge enable signal and bridge enable command illustrated in FIGS. 2E–2G remain low. After the predetermined time delay TD as established by RC network changes state, high RPM bridge enable signal as illustrated in FIG. 2F goes high thereby also causing bridge enable command as illustrated in FIG. 2G to go high and reestablish operation of bridge rectifier 22. Similarly moving on to time T1, high speed operation ends and low speed operation begins as illustrated by a change of state of RPM signal illustrated in FIG. 2A. The relay and intermediate bridge command illustrated in FIG. 2B goes low and thereby causes high RPM bridge enable signal illustrated in FIG. 2F likewise to go low due to disabling of gate 79. Bridge enable command illustrated in FIG. 2G follows, thereby disabling bridge rectifier 22 in preparation for the change in relay state. Again, after a time Tc associated with the delay in relay activation and accounting for switch bounce, the relay achieves steady state as illustrated by a low condition in FIG. 2C. The time delay Td established by the RC network thereafter causes the bridge enable delay signal illustrated in FIG. 2D to change states from high to low which in turn allows low RPM bridge enable signal to attain a high state as illustrated in FIG. 2E. Low RPM bridge enable signal now being high, also establishes the bridge enable command high in FIG. 2G thereby reenabling bridge rectifier 22.

While the invention has been described in terms a preferred embodiment, it is anticipated that various modifications and alternative embodiments will be apparent to those skilled in the art and thus the scope of the invention is intended to encompass such modifications and alternative embodiments in accord with the claims as follows.

The embodiments of the invention in which an exclusive property or privilege is claimed are defined as follows:

1. In a vehicle electrical system having a permanent magnet alternating current generator, said generator having a rotor and a polyphase output winding comprised of first and second winding sets, said first winding set having a larger number of turns per phase than said second winding set, each of said winding sets having AC output voltage terminals, an apparatus for selectively rectifying the AC output voltage from one of said first and second winding sets comprising:

a full-wave rectifier bridge having a DC output voltage and a plurality of AC input terminals corresponding to the number of phases of said generator:

steering means operative in a first mode to couple said plurality of AC input terminals to the first winding set and decouple said plurality of AC input terminals from the second winding set and a second mode to couple said plurality of AC input terminals to the second winding set and decouple said plurality of AC input terminals from the first winding set;

selection means for selecting said first mode when said rotor speed is below a predetermined threshold speed and said second mode when said rotor speed is above said threshold speed.

2. An apparatus as claimed in claim 1 wherein said full-wave rectifier bridge comprises a plurality of controlled rectifiers, said apparatus further comprising control means for controlling the conduction state of said plurality of controlled rectifiers, said control means being responsive to said selection means to cut-off conduction of said controlled rectifiers during a transition from one mode to the other.

3. An apparatus as claimed in claim 2 wherein said control means further controls the conduction timing of said plurality of controlled rectifiers to establish the magnitude of said DC output voltage.

4. In a vehicle electrical system having a permanent magnet alternating current generator, said generator having a rotor and a three phase Y-connected output winding comprising a plurality of respective phase windings, each respective phase winding having a respective neutral terminal, a respective output terminal and a respective tap terminal located intermediate the respective neutral and output terminals, all of said respective neutral terminals being coupled together at a neutral connection, whereby the number of turns per each respective phase winding between the neutral connection and respective tap terminal is less than the number of turns between the neutral connection and respective output terminal, said output terminals providing a first AC output voltage and said tap terminals providing a second AC output voltage, an apparatus for selectively rectifying one of said first and second AC output voltages comprising:

a full-wave rectifier bridge comprised of a plurality of controlled rectifiers and having a DC output voltage and three AC input terminals;

steering means operative in a first mode to couple said AC input terminals to the output terminals of said phase windings and decouple said AC input terminals from the tap terminals of said phase windings and a second mode to couple said AC input terminals to the tap terminals of said phase windings and decouple said AC input terminals from the output terminals of said phase windings;

selection means responsive to the speed of rotation of said rotor for selecting said first mode when the rotor speed is below a predetermined threshold speed and said second mode when said rotor speed is above said threshold speed;

control means for controlling the conduction state of said plurality of controlled rectifiers, said control means being responsive to said selection means to cut-off conduction of said controlled rectifiers during a transition from one mode to the other.

5. An apparatus as claimed in claim 4 wherein said control means further controls the conduction timing of said plurality of controlled rectifiers to establish the magnitude of said DC output voltage.

6. An apparatus as claimed in claim 4 wherein said steering means comprises a three pole double terminal relay.

7. An apparatus as claimed in claim 6 wherein said selection means is effective to substantially simultaneously command the control means to cut-off conduction of said controlled rectifiers and the relay to transition from one mode to the other, said selection means further being effective to command the control means to resume conduction of said controlled rectifiers after a predetermined delay corresponding to the response time of said relay whereby current through said relay terminal is substantially zero by the time the relay transitions from one mode to the other and said relay has attained a steady state by the time said rectifier bridge resumes conduction.

8. An apparatus as claimed in claim 4 wherein said selection means responsive to the speed of rotation of said rotor comprises means that responds to the frequency of voltage generated in said output winding.

\* \* \* \* \*